Oct. 27, 1936.  F. C. PLUCKER  2,058,500
WIND PROPELLED ELECTRIC GENERATOR
Filed April 6, 1936
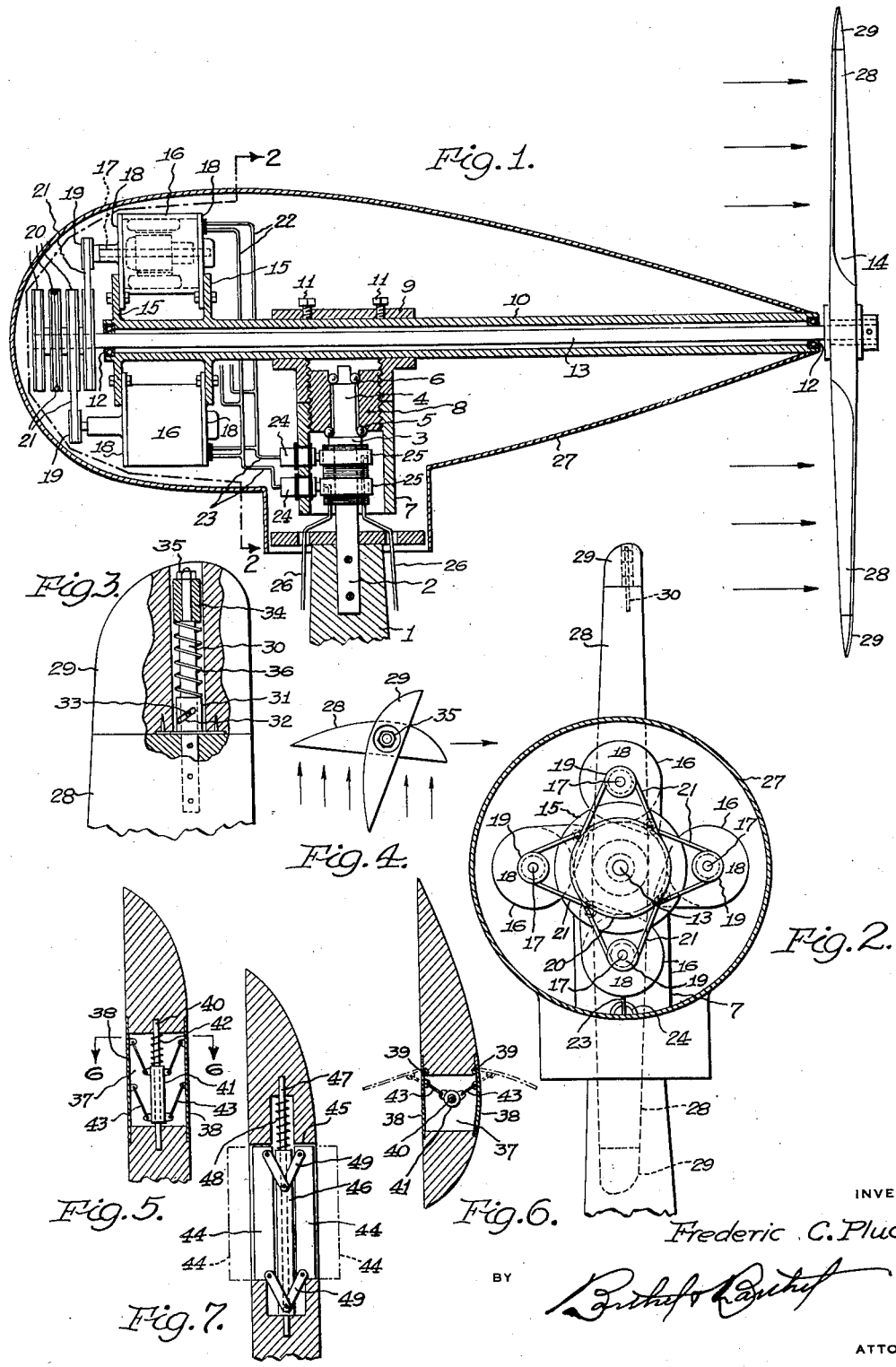
INVENTOR
Frederic C. Plucker,
BY
ATTORNEYS Patented Oct. 27, 1936

2,058,500

UNITED STATES PATENT OFFICE 2,058,500

WIND PROPELLED ELECTRIC GENERATOR

Frederic C. Plucker, Detroit, Mich.

Application April 6, 1936, Serial No. 72,847

5 Claims. (Cl. 290—55)

This invention relates to an electric power generating plant and more particularly to a plant including a wind wheel and generator.

An object of the present invention is to provide a simple, compact structure for the purpose, especially adapted for use in rural communities and adapted to be constructed by an unskilled person, mainly from old motor vehicle parts and embodying a generator or generators directly driven from a shaft upon which the wind wheel or propeller is mounted and which shaft and generator are enclosed within a casing with the arrangement of propeller and casing such as to hold the propeller turned into the wind without the necessity for direction fins or other similar means.

It is also an object to provide a propeller which is self regulating in speed and wherein the blades are provided with means adapted to be operated by centrifugal force to check the speed upon increase thereof beyond a predetermined point.

A further object is to provide a unitary structure for the purpose which is self contained, is very simple and compact in direction, is cheap to manufacture and is not liable to get out of order.

With the above and other ends in view, the invention resides in the matters hereinafter more fully set forth and shown in the accompanying drawing in which Figure 1 is a vertical longitudinal section through a structure illustrative of an embodiment of the present invention;

Fig. 2 is a sectional end elevation substantially upon the line 2—2 of Fig. 1;

Fig. 3 is a sectional detail of an end portion of one of the propeller blades;

Fig. 4 is an end elevation of one of the blades showing a rotatable end portion of the blade turned from its normal position in line with the main part of the blade;

Fig. 5 is a sectional detail of an end portion of a blade showing a modified construction;

Fig. 6 is a transverse section of Fig. 5 taken upon the line 6—6; and

Fig. 7 is a sectional view similar to Fig. 5 and showing a further modified construction.

In the drawing 1 indicates a suitable support or mast upon the upper end of which the windmill is mounted, a suitable shaft or post 2 being secured axially of the mast 1 within a bore in the upper end of the mast, this shaft 2 projecting a considerable distance beyond the end of the mast and being preferably in the form of an end portion of an axle shaft which is formed with a collar 3 and a reduced end portion 4, said reduction and collar each forming a shoulder for the engagement therewith of a series of balls, thus forming bearings 5 and 6 upon the upper end portion of the shaft 2. Surrounding the shaft or post 2, is a sleeve 7 and screw-threaded within the end of this sleeve, is a bearing member 8 formed with annular shoulders to provide raceways for the two sets of balls 5 and 6. The sleeve 7 is thus supported for free rotation upon the post 2 with a space in its lower end between the sleeve and post. Screwed upon the upper end of the member 8, is a T-coupling 9 which forms a bearing for a tube 10, this tube being of considerable length to extend a considerable distance in each direction from its supporting coupling 9. The tube 10 is held against movement within this coupling, by means of set screws 11 and within each end of the tube 10 is a ball bearing 12 within which a long shaft 13 is mounted, this shaft projecting at its ends through the bearings 12 and beyond the ends of the tube 10.

Secured in any suitable manner upon the long end of the shaft 13 is a wind wheel or propeller 14 of any suitable form or construction, the one shown having blades projecting in opposite directions from the hub of the propeller.

Upon the end portion of the tube 10 opposite that end at which the propeller is positioned, is a pair of circular flanges 15 spaced apart to receive therebetween, one or more electric generators 16, preferably four in number arranged equidistant around the tube 10 and shaft 13 and each rigidly secured in any suitable manner between these flanges so that they will be rigidly supported by the projecting end of the tube 10.

Each generator has a shaft 17 projecting from the end of the generator, each generator having end flanges 18 fitting between the flanges 15 and secured thereto in any suitable manner, the shaft 17 of each generator, having bearings in the end walls or flanges 18 of the generator with each shaft 17 projecting longitudinally beyond the end of its generator where it is provided with a pulley 19. Opposite each of these pulleys 19, is a larger pulley 20 mounted upon the projecting end of the shaft 13, the pulleys 20 being mounted side by side and each connected to its pulley 19 on a generator shaft, by means of a belt 21. Rotation of the shaft 13 by means of the propeller 14, will therefore rotate the pulleys 20 and motion will be transmitted therefrom to the pulleys 19 by means of the belts 21, thus rapidly rotating the cores of the several generators 16 and generating current which will be taken off from each generator through leads 22 which are connected together and terminate in leads 23 connected to brushes 24 mounted within openings in the side of the tube 7 and insulated therefrom. These brushes contact collector rings 25 mounted upon and insulated from the shaft or post 2 which forms the support for the mechanism upon the upper end of the mast 1. From these collector rings wires 26 lead down the mast or to any other place where it is desirable to conduct the generated current.

To protect the generators and to enclose the same and also the supporting mechanism as well as the wiring and collector rings and contact members, a casing 27 is provided, this casing being preferably circular in cross section and of oval form in the direction of its length to provide stream-lining effect and offer but little obstruction to the flow of the wind lengthwise of the casing and toward the propeller which is mounted at the small end of the casing and at a greater distance from the vertical axis of rotation of the head or device as a whole about the axis of the fixed stud or shaft 2. As the propeller is mounted at the end of the casing and at a considerable distance from the vertical axis of rotation of the head, the wind engaging the propeller will automatically swing the head to bring the propeller into the wind and therefore fins or other direction means to be engaged by the wind and turn the head is unnecessary.

The mounting comprising the tube or sleeve 7, the coupling 8, and T-member 9 are simply pipe fittings and the tube 10 which is supported thereby provides a support for the several generators and also for the shaft 13 so that the entire mechanism is closely assembled into a head which is entirely enclosed within the casing 27 and therefore a structure is provided which is very simple and cheap to manufacture, the parts including the generators being principally parts from old motor vehicles, and the shaft 13 forming the driving shaft may also be the propeller shaft of a motor vehicle, therefore the electric power windmill may be constructed very cheaply and may be assembled by any unskilled person.

In order to prevent the propeller from running too fast when the wind is strong, the end portion of each blade 28 of the propeller is separate from the main part and as shown in Fig. 3 this separate end 29 of the blade is attached to the end of the main body by means of a fixed shaft 30 within a longitudinal bore in the two parts 28 and 29 and secured to the end member 29 within said bore is a thimble 31, said thimble having an inclined slot 32 within which is a pin 33, this pin being rigid with the shaft or stud 30. On a reduced outer end of the stud 30 is a sleeve 34 held in place by a nut 35 on the outer end of the stud and interposed between the outer end of the thimble 31 and the inner sleeve 34, is a coiled spring 36.

In the operation of this propeller, when its speed increases beyond a fixed point, the centrifugal force acting upon the end portions 29 of the blades, will move these ends outwardly against the action of the coiled springs 36, and as they move outwardly they are caused to turn about the axis of each stud 30 by reason of the engagement of the pins 33 within the inclined slots 32 in the sleeves or thimbles 31. Therefore as the speed of the propeller increases, the end portions 29 of the blades will be turned out of alinement with the body of the blade to position where the flat sides of these end portions will oppose rotation of the propeller, the flat sides of the end portions being turned to a position transversely of the path of rotation of the propeller and thus checking its rotation automatically so that its speed will not be too great and drive the generators at an excessive speed.

In Figs. 5 and 6 a modified form of retarding means is shown as applied to the propeller blades, each blade being formed adjacent its free end with a transverse opening 37 and the ends of this opening are closed flush with the surface of the blade, by means of doors 38 hinged at one side as at 39 for outward swinging movement and to control such opening of the doors, a rod 40 extends transversely of the opening midway between the open ends of the opening and slidable upon this rod is a weight or sleeve 41 with a spring 42 sleeved upon the rod between the end of the sleeve and the end of the opening in the blade. Connecting the sleeve and the doors at a distance from the hinge pivots of the doors are links 43 with these links so arranged that when the sleeve is moved toward the spring along the rod, these links will turn upon their pivotal connections with the sleeve and doors, and swing the doors toward open position. When the speed of the propeller blade increases to such an extent that the centrifugal force will move the sleeve 41 against the action of the spring 42, then the doors will be swung toward open position and will catch the air in a manner to retard the rotation of the propeller. As the speed decreases, the spring 42 will move the sleeve 41 inwardly toward the hub of the propeller and gradually close the doors, reducing the resistance which they offer to the rotation of the propeller.

In Fig. 7 is shown a construction similar to that shown in Figs. 5 and 6 with the exception that instead of the doors being hinged to close the sides of the opening in the blade, these doors 44 are arranged to slide outwardly in the direction of their width from the slots 45 in the blade and this sliding movement is effected by means of a weight 46 slidable upon a rod 47 similar to the rod 40 and this sliding movement is opposed by a spring 48 similar to the spring 42. Upon the movement of the weight 46, outward sliding of the doors 44 is effected by pivotally attaching one end of links 49 to the sleeve and the opposite ends of these links to the doors so that as the sleeve moves outwardly, the links will be swung and the doors will be shoved outwardly from the opening in the blade.

While a particular construction and arrangement has been described it will be understood that changes may be made in such construction without departing from the spirit of the invention and I do not therefore limit myself to the particular construction, combination and arrangement shown.

Having thus fully described my invention what I claim is:

1. The combination of a vertically extending support, supporting means mounted upon said support for free rotation thereon, a tubular member of extended length mounted upon said supporting means and extending at right angles to said vertical support, a shaft within said tubular member and projecting from each end thereof, a propeller upon one end of said shaft, a generator mounted upon said tubular member adjacent the opposite end of said shaft, and means for transmitting motion from the adjacent end of said shaft to said generator.

2. In a device of the character described, the combination of a vertical mast, a fixed shaft projecting from the end of said mast, bearing means mounted upon said fixed shaft for free rotation thereon, a tubular member mounted upon said bearing means and extending at right angles to the axis of said fixed shaft, a driving shaft within said tubular member with its ends projecting from the ends of said member, a propeller upon one end of said driving shaft, a generator rigidly supported by the end of said tubular member opposite that adjacent which the propeller is supported by said driving shaft, and means for transmitting motion from said driving shaft to drive said generator.

3. In a device of the character described, the combination of a fixed vertical shaft, a tubular member mounted upon said shaft for free rotation thereof, a bearing member mounted upon said tubular member, a long tube mounted in said bearing member and extending at right angles to the axis of said fixed shaft, a driving shaft extending through said tube, a propeller upon one end of said driving shaft, a plurality of generators rigidly mounted upon said tube in a series around said tube, pulleys upon the end of said driving shaft, and a belt for transmitting motion from each of said pulleys to each of said generators.

4. In a device of the character described, the combination of a vertically extending shaft, a bearing member mounted upon the upper end of said shaft for free rotation thereof, a sleeve secured to said bearing member, a coupling member secured to said bearing member, a tube of extended length supported intermediate its ends by said coupling member, a driving shaft within said tube and projecting from the ends thereof, a propeller upon one end of said shaft, a generator rigidly secured to said tube adjacent the end of the shaft opposite that to which the propeller is secured, means for transmitting motion from the driving shaft to drive the generator, contacts mounted upon said tube surrounding said vertical shaft, and collector rings upon said vertical shaft contacted by said contact members.

5. A device for the purpose described including a vertical mast, a supporting shaft projecting from the upper end of said mast, a bearing member mounted upon said shaft for free rotation thereon, a T-coupling mounted upon said bearing member, a tube mounted in said T-coupling and extending at right angles to the axis of said shaft with one end of said tube projecting a greater distance laterally from said coupling than the other end thereof, a drive shaft within said tube, a propeller upon one end of said drive shaft adjacent the end of the tube which projects the greatest distance from said coupling, an electric generator mounted upon the end of said tube projecting the lesser distance from said coupling, means for transmitting motion from said drive shaft to drive said generator, contact members supported adjacent said supporting shaft, conduits connecting said generator with said contacts, collector rings upon said supporting shaft with said contacts in contact therewith, conduits leading from said collector rings, and a casing enclosing said supporting means for said shaft, tube and generator, said casing being circular in cross section and of oval form in length.

FREDERIC C. PLUCKER.